(12) United States Patent
Ginestra et al.

(10) Patent No.: US 7,820,579 B2
(45) Date of Patent: Oct. 26, 2010

(54) METHOD OF RESTORING CATALYTIC ACTIVITY TO A SPENT HYDROTREATING CATALYST, THE RESULTING RESTORED CATALYST, AND A METHOD OF HYDROPROCESSING

(75) Inventors: Josiane Marie-Rose Ginestra, Richmond, TX (US); James Dallas Seamans, The Woodlands, TX (US); Kenneth Scott Lee, The Woodlands, TX (US)

(73) Assignee: Shell Oil Company, Houston, TX (US)

( * ) Notice: Subject to any disclaimer, the term of this patent is extended or adjusted under 35 U.S.C. 154(b) by 1011 days.

(21) Appl. No.: 11/038,291

(22) Filed: Jan. 19, 2005

(65) Prior Publication Data

US 2005/0159295 A1 Jul. 21, 2005

Related U.S. Application Data

(60) Provisional application No. 60/537,499, filed on Jan. 20, 2004.

(51) Int. Cl.
*B01J 38/50* (2006.01)
*B01J 38/62* (2006.01)
*B01J 38/12* (2006.01)

(52) U.S. Cl. .............................. 502/29; 502/28; 502/38
(58) Field of Classification Search .................. 502/22, 502/25, 27–33, 38, 56
See application file for complete search history.

(56) References Cited

U.S. PATENT DOCUMENTS

| | | | |
|---|---|---|---|
| 5,468,372 A | 11/1995 | Seamans et al. | 208/216 |
| 6,239,054 B1 | 5/2001 | Shukis et al. | 502/29 |
| 6,239,066 B1 | 5/2001 | Shukis et al. | 502/355 |
| 6,291,394 B1 | 9/2001 | Shukis et al. | 502/355 |
| 6,635,596 B1 | 10/2003 | Eijsbouts et al. | 502/38 |

FOREIGN PATENT DOCUMENTS

| | | |
|---|---|---|
| EP | 541994 | 5/1993 |
| EP | 1043069 | 10/2000 |
| WO | 95/31280 | 11/1995 |
| WO | 96/41848 | 12/1996 |
| WO | 01/02092 | 1/2001 |

OTHER PUBLICATIONS

Written Opinion for PCT/US2005/001825 of May 12, 2005.

*Primary Examiner*—Stanley Silverman
*Assistant Examiner*—Anthony J Zimmer
(74) *Attorney, Agent, or Firm*—Charles W. Stewart

(57) ABSTRACT

A method of restoring catalytic activity to a spent hydroprocessing catalyst that has a first carbon concentration. The concentration of carbon on the spent hydroprocessing catalyst is reduced to provide a carbon-reduced catalyst having a second carbon concentration that is less than the first carbon concentration. The carbon-reduced catalyst is exposed to a solution, comprising a chelating agent and a solvent, for an aging time period sufficient to provide for a restored catalytic activity thereby resulting in an aged catalyst having incorporated therein the chelating agent and the solvent. The aged catalyst is exposed to conditions, including a drying temperature, so as to remove from the aged catalyst a portion of the solvent without removing a significant portion of the chelating agent from the aged catalyst thereby resulting in a dried aged catalyst. The dried aged catalyst is then sulfur treated to thereby provide a restored catalyst. The restored catalyst and those catalysts made by the treatment method can be used in a hydroprocessing process comprising contacting the restored catalyst with a hydrocarbon feedstock under hydroprocessing conditions.

34 Claims, No Drawings

METHOD OF RESTORING CATALYTIC ACTIVITY TO A SPENT HYDROTREATING CATALYST, THE RESULTING RESTORED CATALYST, AND A METHOD OF HYDROPROCESSING

This application claims the benefit of U.S. Provisional Application No. 60/537,499 filed Jan. 20, 2004, the entire disclosure of which is hereby incorporated by reference.

This invention relates to a method of restoring catalytic activity to a spent hydrotreating catalyst, the resulting restored catalyst and its use in hydroprocessing.

BACKGROUND OF THE INVENTION

International publication number WO 01/02092 (Akzo) discloses a process for regenerating a used additive-based catalyst by contacting it with an oxygen-containing gas. The regenerated catalyst is rejuvenated by contacting it with an organic additive followed by drying to remove the additive solvent therefrom. The publication discloses that the regenerated and rejuvenated catalyst may also be presulfided, but it fails to in anyway describe the presulfiding methodology, and it fails to teach presulfurization using elemental sulfur. The publication further fails to teach revitalization of a catalyst using a chelation mechanism, and it especially fails to teach the use of a chelant in combination with aging to provide for a revitalized catalyst. It is especially noteworthy that the teachings of the publication only relate to an additive-based catalyst. The publication does not provide any teaching regarding the calcination of the regenerated catalyst that has had incorporated therein the organic additive.

U.S. Pat. No. 6,239,054 B1 discloses the use of a chelating agent in a process for improving the activity of a spent catalyst by treating the spent catalyst with a chelating agent followed by drying and calcining. The claimed process requires the calcining step. There is an ongoing need to find better methods for restoring the activity of catalysts that have lost activity due to their use, particularly, when the catalyst is a spent high activity hydrotreating catalyst.

SUMMARY OF THE INVENTION

Accordingly, one inventive method includes contacting a spent catalyst, having a reduced catalytic activity relative to a catalyst in its fresh state prior to use thereof to thereby provide the spent catalyst, with a solution comprising a chelating agent and a solvent. The contacting is done for a time period sufficient to provide for a restored catalytic activity thereby resulting in an aged catalyst having incorporated therein the chelating agent and the solvent. The aged catalyst is exposed to conditions including a drying temperature so as to remove from the aged catalyst a portion of the solvent without removing a significant portion of the chelating agent from the aged catalyst thereby resulting in a dried aged catalyst. The dried aged catalyst is then sulfur treated to yield a restored catalyst.

Another embodiment of the invention relates to a method of restoring catalytic activity to a spent hydrotreating catalyst that has a first carbon concentration. In this method, the concentration of carbon on the spent hydrotreating catalyst is reduced to provide a carbon-reduced catalyst having a second carbon concentration that is less than the first carbon concentration. The carbon-reduced catalyst is exposed to a solution, comprising a chelating agent and a solvent, for an aging time period sufficient to provide for a restored catalytic activity thereby resulting in an aged catalyst having incorporated therein the chelating agent and the solvent. The aged catalyst is exposed to conditions, including a drying temperature, so as to remove from the aged catalyst a portion of the solvent without removing a significant portion of the chelating agent from the aged catalyst thereby resulting in a dried aged catalyst. The dried aged catalyst is then sulfur treated to thereby provide a restored catalyst.

A still further embodiment of the inventive method includes providing a spent hydrotreating catalyst that contains carbon from which carbon is removed so as to provide a carbon-reduced catalyst. A chelating agent is incorporated into the carbon-reduced catalyst by exposing the carbon-reduced catalyst to a solution comprising the chelating agent and a solvent. The resulting chelant-incorporated carbon-reduced catalyst is aged for an aging time period sufficient to provide for a restored catalytic activity to the carbon-reduced catalyst thereby providing an aged catalyst. The aged catalyst is dried at a drying temperature so as to remove from the aged catalyst a portion of the solvent without removing a significant portion of the chelating agent from the aged catalyst thereby resulting in a dried aged catalyst. The dried aged catalyst is sulfur treated to yield a restored catalyst.

In accordance with another invention, provided is a catalyst composition comprising a spent catalyst, having incorporated therein a solution; wherein the solution comprises a chelating agent and a solvent; and wherein the resulting spent catalyst, having incorporated therein the solution, has been aged for an aging time period and then dried to remove a portion of the solvent contained therein without removing therefrom a significant portion of the chelating agent and thereafter followed by the sulfur treatment thereof to thereby provide the catalyst.

The restored catalyst and those catalysts made by the aforementioned treatment methods can be used in a hydroprocessing process comprising contacting the catalyst with a hydrocarbon feedstock under hydroprocessing conditions.

Other objects and advantages of the invention will become apparent from the following detailed description and appended claims.

DETAILED DESCRIPTION OF THE INVENTION

The invention relates to a method for restoring catalytic activity to a catalyst, preferably a hydroprocessing catalyst, which has become spent due to its use. Also, the invention relates to a hydroprocessing catalyst and other catalyst compositions having restored catalytic activity and made by the treatment of a spent hydroprocessing catalyst using the inventive methods described herein. Further, the invention relates to a hydroprocessing process that utilizes the restored hydroprocessing catalysts of the invention.

The hydroprocessing catalyst of the invention can be any suitable hydrogenation catalyst including conventional hydroprocessing catalysts that comprise a metal component on a support material. The metal component can include a Group VIB metal component or a Group VIII metal component, or both metal components. It is preferred for the hydroprocessing catalyst to comprise both a Group VIB metal component and a Group VIII metal component. The hydroprocessing catalyst can also include a promoter such as a phosphorous component.

The Group VIII metal component of the hydroprocessing catalyst composition are those Group VIII metal or metal compounds that, in combination with the other components of the catalyst composition, suitably provide a hydroprocessing catalyst. The Group VIII metal can be selected from the group consisting of nickel, cobalt, palladium and platinum. Preferably, the Group VIII metal is either nickel or cobalt.

The Group VIII metal component contained in the hydroprocessing catalyst composition can be in the elemental form or in the form of a metal compound, such as, for example, oxides, sulfides and the like. The amount of Group VIII metal in the hydroprocessing catalyst composition can be in the range of from about 0.1 about 6 weight percent elemental metal based on the total weight of the hydroprocessing catalyst composition. Preferably, the concentration of Group VIII metal in the hydroprocessing catalyst composition is in the range of from 0.3 weight % to 5 weight %, and, most preferably, the concentration is in the range of from 0.5 weight % to 4 weight %.

The Group VIB metal component of the hydroprocessing catalyst composition are those Group VIB metal or metal compounds that, in combination with the other elements of the hydroprocessing catalyst composition, suitably provide a hydroprocessing catalyst. The Group VIB metal can be selected from the group consisting of chromium, molybdenum and tungsten. The preferred Group VIB metal is either molybdenum or chromium and, most preferred, it is molybdenum.

The Group VIB metal component contained in the hydroprocessing catalyst composition can be in the elemental form or in the form of a metal compound, such as, for example, oxides, sulfides and the like. The amount of Group VIB metal in the hydroprocessing catalyst composition can be in the range of from about 5 to about 25 weight percent elemental metal based on the total weight of the hydroprocessing catalyst composition. Preferably, the concentration of Group VIB metal in the hydroprocessing catalyst composition is in the range of from 6 weight % to 22 weight %, and, most preferably, the concentration is in the range of from 7 weight % to 20 weight %.

The support material of the hydroprocessing catalyst can be any material that suitably provides a support for the metal hydrogenation components of the hydroprocessing catalyst including porous refractory oxides. Examples of possible suitable porous refractory oxides include silica, magnesia, silica-titania, zirconia, silica-zirconia, titania, titania-alumina, zirconia-alumina, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The porous refractory oxide generally has an average pore diameter in the range of from about 50 Angstroms to about 200 Angstroms, preferably, from 70 Angstroms to 175 Angstroms, and, most preferably, from 80 Angstroms to 150 Angstroms. The total pore volume of the porous refractory oxide, as measured by standard mercury porisimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram. The surface area of the porous refractory oxide, as measured by the B.E.T. method, generally exceeds about 100 m$^2$/gram, and it is typically in the range of from about 100 to about 400 m$^2$/gram.

The inventive method for restoring catalytic activity to a spent catalyst is particularly applicable to the treatment of non-additive based hydroprocessing catalysts that have become spent as a result of use. A non-additive based hydroprocessing catalyst is an hydroprocessing catalyst that has not had incorporated therein an organic additive prior to its use in the hydroprocessing of a hydrocarbon feedstock or prior to a presulfurization treatment performed before the use of the hydroprocessing catalyst. Thus, the non-additive based hydroprocessing catalyst is a hydroprocessing catalyst, as described above, but which has not had incorporated therein an organic additive prior to the use of the hydroprocessing catalyst or prior to its presulfurization.

When it is said that the hydroprocessing catalyst has not had incorporated therein an organic additive, what is meant is that, in the manufacture or preparation of the hydroprocessing catalyst, an organic additive, as defined below, has not been incorporated into the hydroprocessing catalyst either prior to, or subsequent to, or simultaneously with the incorporation of the hydrogenation metal component or components into the other components of the hydroprocessing catalyst, such as, for example, the support material. Thus, the non-additive based hydroprocessing catalyst, when in a fresh state prior to use or to presulfurization, has an absence, preferably an absence of a material quantity, of an organic additive, and it otherwise is the hydroprocessing catalyst as described in detail above which comprises a metal component on a support material. Such a non-additive based hydroprocessing catalyst further can consist essentially of a metal component and a support material, and it can, optionally, include a promoter component. The types, properties and amounts of metal components, support material and promoter components of the non-additive based hydroprocessing catalyst are as described above.

It is understood that, as used in this specification, the term hydroprocessing catalyst includes both additive based and non-additive based hydroprocessing catalysts. Examples of additive-based catalysts are described in detail in U.S. Pat. No. 6,635,596 B1, which is incorporated herein by reference. The term organic additive, as used in this specification, may have the same meaning as the term has in the referenced U.S. Pat. No. 6,635,596 B1. Furthermore, the organic additive referred to herein is defined as including, for example, organic compounds comprising at least two oxygen atoms and 2-10 carbon atoms and the compounds built up from these compounds, and organic compounds comprising at least one covalently bonded nitrogen atom and at least one carbonyl moiety. Thus, in the manufacture of the non-additive based hydroprocessing catalyst, neither organic compounds comprising at least two oxygen atoms and 2-10 carbon atoms and the compounds built up from these compounds nor organic compounds comprising at least one covalently bonded nitrogen atom and at least one carbonyl moiety is used.

The hydroprocessing catalyst can be used in the hydrotreatment of a hydrocarbon feedstock under suitable hydrotreatment process conditions. Typical hydrocarbon feedstocks can include petroleum-derived oils, for example, atmospheric distillates, vacuum distillates, cracked distillates, raffinates, hydrotreated oils, deasphalted oils, and any other hydrocarbon that can be subject to hydrotreatment. More typically, the hydrocarbon feedstock that is treated with the hydroprocessing catalyst is a petroleum distillate such as a straight run distillate or a cracked distillate with the hydrotreatment being to remove sulfur from sulfur-containing compounds or nitrogen from nitrogen-containing compounds, or both, from the hydrocarbon feedstock.

More specifically, the hydrocarbon feedstock can include such streams as naphtha, which typically contains hydrocarbons boiling in the range of from 100° C. (212° F.) to 160° C. (320° F.), kerosene, which typically contains hydrocarbons boiling in the range of from 150° C. (302° F.) to 230° C. (446° F.), light gas oil, which typically contains hydrocarbons boiling in the range of from 230° C. (446° F.) to 350° C. (662° F.), and even heavy gas oils containing hydrocarbons boiling in the range of from 350° C. (662° F.) to 430° C. (806° F.)

The hydrotreating conditions to which the hydroprocessing catalyst is subjected are not critical and are selected as is required taking into account such factors as the type of hydrocarbon feedstock that is treated and the amounts of sulfur and nitrogen contaminants contained in the hydrocarbon feedstock. Generally, the hydrocarbon feedstock is contacted with the hydroprocessing catalyst in the presence of hydrogen under hydrotreatment conditions such as a hydrotreating contacting temperature generally in the range of from about 150° C. (302° F.) to about 538° C. (1000° F.) preferably from 200° C. (392° F.) to 450° C. (842° F.) and most preferably from 250° C. (482° F.) to 425° C. (797° F.).

The hydrotreating total contacting pressure is generally in the range of from about 500 psia to about 6,000 psia, which includes a hydrogen partial pressure in the range of from about 500 psia to about 3,000 psia, a hydrogen addition rate per volume of hydrocarbon feedstock in the range of from about 500 SCFB to about 10,000 SCFB, and a hydrotreating liquid hourly space velocity (LHSV) in the range of from about 0.2 hr$^{-1}$ to 5 hr$^{-1}$. The preferred hydrotreating total contacting pressure is in the range of from 500 psia to 2,500 psia, most preferably, from 500 psia to 2,000 psia, with a preferred hydrogen partial pressure of from 800 psia to 2,000 psia, and most preferred, from 1,000 psia to 1,800 psia. The LHSV is preferably in the range of from 0.2 hr-1 to 4 hr-1, and, most preferably, from 0.2 to 3 hr-1. The hydrogen addition rate is preferably in the range of from 600 SCFB to 8,000 SCFB, and, more preferably, from 700 SCFB to 6,000 SCFB.

One way the hydroprocessing catalyst can become spent is by use under hydrotreatment conditions as described above. It is generally considered that one cause of the loss of catalytic activity is due to the deposition of carbonaceous material into the pore structure of the hydroprocessing catalyst as a result of its use and that the spent hydroprocessing catalyst can have a carbon content generally above 3 weight percent with the weight percent being based on the total weight of the spent hydroprocessing catalyst including carbon and other components deposited upon the hydroprocessing catalyst. Typically, the carbon content of the spent hydroprocesing catalyst is in the range of from 5 weight percent to 25 weight percent, and, more typically, the carbon content is in the range of from 6 weight percent to 20 weight percent.

In addition to having a high carbon concentration, the spent hydroprocessing catalyst can have a relative volumetric activity (RVA) that is reduced below the RVA of an hydroprocessing catalyst in its fresh state prior to its use that thereby provides the spent hydroprocessing catalyst. The hydroprocessing catalyst can be considered spent when the RVA is less than 0.65. But, economic and process considerations usually determine the point at which the hydroprocessing catalyst is spent. The hydroprocessing catalyst, thus, can be spent when the RVA is less than 0.5 and even less than 0.4.

As used in this specification, the term "relative volumetric activity" (RVA) refers to the catalytic activity with respect to either hydrodesulfurization (HDS) or hydrodenitrogenation (HDN) of a specific catalyst that has been used relative to the catalytic activity of the specific catalyst in its fresh, unused state. Thus, the RVA of the fresh reference catalyst is by definition 1. The RVA of the evaluated catalyst can be represented by the following formula:

$$RVA=(\text{Rate Constant for evaluated catalyst})/(\text{Rate Constant for fresh reference catalyst})$$

wherein, for the case of hydrodesulfurization (HDS) RVA, the Rate Constants are calculated assuming an HDS reaction order of 1.3; and for the case of hydrodenitrogenation (HDN) RVA, the Rate Constants are calculated assuming an HDN reaction order of 1.0.

One feature of the inventive method for the restoration of catalytic activity to the spent hydroprocessing catalyst can include a carbon reduction step that provides for a reduced concentration of carbon on the spent hydroprocessing catalyst. Any suitable method know in the art can be used to reduce the carbon concentration on the spent hydroprocessing catalyst to thereby provide the carbon-reduced catalyst. A preferred method includes heat treating the spent hydroprocessing catalyst by contacting it with an oxygen-containing gas, comprising oxygen, under suitable carbon burning conditions so as to combust or burn or oxidize the carbon that is on the spent hydroprocessing catalyst to thereby provide the carbon-reduced catalyst. The carbon-reduced catalyst has a reduced carbon concentration that is less than the carbon concentration on the spent hydroprocessing catalyst.

The required carbon burning conditions can be dependent upon the amount of carbon on the spent hydroprocessing catalyst, and, generally, the spent hydroprocessing catalyst is contacted with the oxygen-containing gas under such conditions that the temperature of the spent hydroprocessing catalyst does not exceed 500° C. with a suitable heat treatment, or carbon burning, temperature being in the range of from about 300° C. to about 500° C. The preferred carbon burning temperature is in the range of from 320° C. to 475° C., and, most preferably, from 350° C. to 425° C.

The oxygen concentration of the oxygen-containing gas can be controlled so as to provide the desired carbon burning temperature conditions. The oxygen-containing gas is preferably air, which can be diluted with other gases, for instance, inert gases such as nitrogen, to control the concentration of oxygen in the oxygen-containing gas. The carbon burn can be conducted within a combustion zone wherein is placed the spent hydroprocessing catalyst and into which is introduced the oxygen-containing gas. The time period for conducting the carbon burn is not critical and is such as to provide a carbon-reduced catalyst, having the reduced carbon concentration, and it is generally in the range of from about 0.1 hours to 48 hours, or more.

The carbon concentration of the carbon-reduced catalyst as already noted is less than the carbon concentration of the spent hydroprocessing catalyst. Generally, the carbon concentration of the carbon-reduced catalyst is less than 3 weight percent of the total weight of the carbon-reduced catalyst, and, preferably, the carbon concentration is less than 2.5 weight percent. Most preferably, the carbon concentration of the carbon-reduced catalyst is less than 2 weight percent.

The inventive method further includes a step for treating the spent hydroprocessing catalyst, and, preferably, a spent hydroprocessing catalyst that is a carbon-reduced catalyst, with a chelating agent. The chelating agent, or chelant, suitable for use in the chelating treatment step of the inventive method includes those compounds that are capable of forming complexes with the metal components, such as any of the Group VIII metals and Group VIB metals, contained in the carbon-reduced catalyst. It is particularly important to the inventive method that the chelant have properties that provide for the restoration of catalytic activity in the carbon-reduced catalyst.

While not wanting to be bound to any particular theory, it is nevertheless believed that the chelating agent provides for the restoration of catalytic activity by re-dispersing the active metals contained in the carbon-reduced catalyst that have become agglomerated due to prior use and exposure to high temperatures, including exposure to carbon burning conditions of the hydroprocessing catalyst and its derivatives from which the carbon-reduced catalyst is derived. The amount of metal re-dispersion may be demonstrated and observed through electron microscopic photographs.

The chelating agent is added to the carbon-reduced catalyst in a liquid form preferably by use of a solution containing the chelating agent which complexes with the agglomerated metal of the carbon-reduced catalyst. The complexes are, thus, in a liquid phase that provides for mobility of the complexes and assists in the transport of the metal throughout the carbon-reduced catalyst to thereby provide for the re-dispersion of the metals.

Any chelant compound that suitably provides for the benefit of restored catalytic activity as required by the inventive method described herein can be used in the chelating treatment of the carbon-reduced catalyst. Among these chelant compounds are those chelating agents that contain at least one nitrogen atom that can serve as the electron donor atom for forming the complexes with the metals of the carbon-reduced catalyst.

Examples of possible nitrogen atom containing chelating agents include those compounds that can be classified as aminocarboxylic acids, polyamines, aminoalcohols, oximes, and polyethyleneimines.

Examples of aminocarboxylic acids include ethylenediaminetetraacetic acid (EDTA), hydroxyethylenediaminetriacetic acid (HEDTA), diethylenetriaminepentaacetic acid (DTPA), and nitrilotriacetic acid (NTA).

Examples of polyamines include ethylenediamine, diethylenetriamine, triethylenetetramine, and triaminotriethylamine.

Examples of aminoalcohols include triethanolamine (TEA) and N-hydroxyethylethylenediamine.

The preferred chelating agent for use in the inventive method is an aminocarboxylic acid that can be represented by the following formula:

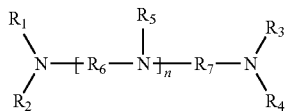

Wherein $R_1$, $R_2$, $R_3$, $R_4$ and $R_5$ are each independently selected from alkyl, alkenyl, and allyl with up to 10 carbon atoms and which may be substituted with one or more groups selected from carbonyl, carboxyl, ester, ether, amino, or amide; wherein R6 and R7 are each independently selected from an alkylene group with up to 10 carbon atoms; wherein n is either 0 or 1; and wherein one or more of the $R_1$, $R_2$, $R_3$, $R_4$ and $R_5$ has the formula:

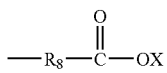

Wherein, $R_8$ is an alkylene having from 1 to 4 carbon atoms; and wherein the X is either hydrogen or another cation.

Preferred chelating agents include ethylenediaminetetraacetic acid (EDTA), hydroxyethylenediaminetriacetic acid (HEDTA), and diethylenetriaminepentaacetic acid (DTPA). The most preferred chelating agent is DTPA.

Any suitable means or method can be used to contact the carbon-reduced catalyst with the chelating agent or solution having a concentration of chelating agent; provided, such means or method provides for the suitable incorporation or impregnation of the chelating agent within the pores of the carbon-reduced catalyst. Examples of suitable methods of applying the chelating agent or chelating solution to the carbon-reduced catalyst can include dipping or spraying. A preferred method for contacting the carbon-reduced catalyst with the chelating agent or chelating solution is by any suitable impregnation method known to those skilled in the art, for instance, impregnation by incipient wetness whereby the amount or volume of chelating solution added to the carbon-reduced catalyst is such that the total volume of the added chelating solution is such that it is in the range of up to about the total pore volume of the carbon-reduced catalyst to be impregnated with the chelating solution.

The chelating solution can be a solution comprising the chelating agent and a solvent that suitably provides for the dissolution of the chelating agent. Possible solvents include water and alcohols, such as, methanol and ethanol, with water being the preferred solvent for the chelating agent. The amount of chelating agent that is applied to the carbon-reduced catalyst should be such as to provide for the desired restored catalytic activity as described herein; and, generally, the amount is such as to incorporate into the carbon-reduced catalyst chelating agent in the range of from about 0.005 moles chelant to about 1 mole chelant per mole of active metal, i.e., Group VIII and Group VIB metals described above, that is in the carbon-reduced catalyst. It is more preferred to add to the carbon-reduced catalyst an amount of chelating agent that is in the range of from 0.01 to 0.5 moles of added chelating agent per mole of hydrogenation metal in the carbon-reduced catalyst. Most preferred, the amount of chelating agent added to the carbon-reduced catalyst is in the range of from 0.05 to 0.1 moles of added chelant per mole of hydrogenation metal.

It has been discovered that in order to realize the benefit from the combined steps of reduction of the carbon concentration of the spent catalyst followed by a chelating agent treatment of the resulting carbon-reduced catalyst, along with the other steps and features of the inventive method, it is essential for the chelating agent treatment step to include an aging or soaking of the carbon-reduced catalyst for a sufficiently long time period. If this time period is not long enough, no significant benefit in improved catalytic activity is recognized.

The carbon-reduced catalyst having incorporated therein the chelating agent is, thus, aged for an aging time period necessary to provide for the enhancement of restored catalytic activity. It is theorized that a sufficiently long aging period is required in order to allow for the chelant to react with the metals of the carbon-reduced catalyst to thereby form chelates and to allow the re-dispersion of the metals. In any event, there is a minimum time required for the aging period before a significant incremental benefit is seen in the restored catalytic activity of the carbon-reduced catalyst that is subsequently treated with the chelant and sulfurized. This minimum aging time can depend upon the temperature at which the aging is conducted and the type and amount, relative to the carbon-reduced catalyst, of chelant used.

Generally, for the preferred amino carboxylic acid chelating agents to obtain any significant benefit from the aging, it is essential that the aging time period exceed about 10 hours, but, preferably, the aging time period should exceed 20 hours, and, most preferably, 40 hours. There is also a maximum amount of aging time at which no significant incremental increase in restored catalytic activity is achieved. The maximum aging time is generally no more than 900 hours. The preferred maximum aging time is less than 600 hours and, more preferred, the maximum aging time is less than 400 hours. Thus, the aging time period for contacting the carbon-reduced catalyst or for allowing the chelating agent that is incorporated within the pores of the carbon-reduced catalyst to remain thereon or to soak is in the range of from about 10 hours to about 900 hours, preferably from 20 hours to 600 hours, and, most preferably, from 40 hours to 400 hours.

The aging temperature at which the aging is conducted can be any temperature that provides for the aged catalyst with at least some redispersion of the metals of the carbon-reduced catalyst and can generally be in the range of from about the freezing temperature of the relevant chelating agent or solution of chelating agent used in the chelating treatment step upwardly to about its boiling temperature. Typically, the carbon-reduced catalyst is placed within a container that defines a containment zone wherein the aging of the carbon-reduced catalyst occurs. It is understood that the carbon-reduced catalyst may be mixed with the chelant or chelating solution prior to the resulting mixture being placed within the container or they may be mixed within the container. While the container may be subject to temperature control; more typically, it is merely exposed to ambient or atmospheric temperature conditions. Thus, the temperature at which the aging step occurs can be in the range of from about 0° C. to about 100° C., and more typically, from 5° C. to 90° C. Preferably, the aging temperature is in the range of from 10° C. to 60° C.

The aged catalyst is then subjected to a drying step. The drying of the aged catalyst is to remove at least a portion of the solvent of the chelating solution from the aged catalyst while leaving at least a portion, preferably a major portion of the chelating agent on the aged catalyst. In a preferred embodiment of the invention, it is important for the dried, aged catalyst to include therein an amount or a concentration of chelant when it undergoes a sulfur treatment as described below.

In the drying of the aged catalyst it is desirable to remove as little of the chelant from the aged catalyst as is practical and, thus, more than about 50 weight percent of the chelant that is originally incorporated into the carbon-reduced catalyst, based on the total weight of chelant originally incorporated into the carbon-reduced catalyst, will remain in the resulting dried, aged catalyst. Preferably, the amount of chelant remaining on the dried, aged catalyst exceeds 75 weight percent, and, most preferably, more than 90 weight percent of the chelant originally added to the carbon-reduced catalyst remains in the carbon-reduced catalyst when it is subjected to the sulfur treatment. Thus, the dried aged catalyst has a concentration of chelant, and, less than 50 weight percent, preferably less than 25 weight percent, and most preferably less than 10 weight percent, of the chelant originally added to the carbon-reduced catalyst is removed therefrom when the aged catalyst is dried. It is understood that when referring herein to the chelant or chelating agent that is removed from the aged catalyst, it is considered that the references are to the chelant or chelating agent either in a form of a complex or in its original form, or a combination of both forms.

The drying can be conducted by any suitable method known to those skilled in the art. Typically, to dry the aged catalyst, hot air or any other suitable gas, such as nitrogen and carbon dioxide, is passed over the aged catalyst. The drying temperature should not exceed 250° C., and, can generally be in the range of from 90° C. to 200° C. Preferably, the drying temperature is less than 175° C. and can range from 100° C. to 175° C. The drying step is carefully controlled in order to avoid either evaporating or converting a substantial portion of the chelant or chelates contained in the aged catalyst.

An essential feature of the inventive method is for the aged catalyst, either in its dried state or otherwise and prior to sulfur treatment, not to be subjected to high temperature conditions, such as calcination temperature conditions. Therefore, the maximum exposure temperature to which the aged catalyst or dried aged catalyst is to be subjected prior to sulfur treatment is less than a calcination temperature of 400° C., and, preferably, the maximum exposure temperature is less than 300° C. In a more preferred embodiment, the aged catalyst is exposed only to drying conditions prior to sulfur treatment and, thus, the maximum exposure temperature is a drying temperature that is less than 250° C., and, most preferably, the maximum exposure temperature less than 200° C.

The dried, aged catalyst having remaining therein, as discussed above, chelant or chelate is subjected to a sulfur treatment in order to re-sulfide the hydrogenation metal components that are in the oxide form. The dried aged catalyst having a concentration of chelant compound within the range as described above undergoes a sulfur step by which sulfur or a sulfur compound, or a combination of both, is incorporated into the dried, aged catalyst to thereby provide a restored catalyst. Any suitable method known to those skilled in the art can be used to sulfur treat the dried, aged catalyst to yield the high activity hydrotreating catalyst including, for example, both the known in-situ and ex-situ sulfurization and sulfiding methods.

In a typical in-situ sulfiding, the dried, aged catalyst is placed in a reactor vessel that defines a reaction zone. A fluid stream containing a sulfur compound is passed over the dried, aged catalyst and contacted therewith under such suitable temperature conditions as to provide a sulfided catalyst, and, thus, the restored catalyst. The sulfur compound can include any known and suitable sulfiding agents, such as, hydrogen sulfide, organic sulfur compounds that are typically found in petroleum hydrocarbon feeds, and other organic sulfur compounds such as dimethyl sulfide, dimethyldisulfide, dimethylsulfoxide, dimethylmercaptan, butylmercapton, and carbon disulfide. Typical temperatures at which the sulfiding fluid stream is contacted with the dried aged catalyst can be in the range of from 150° C. to 400° C., and, more typically, from 200° C. to 350° C.

In the ex-situ sulfiding method, the dried, aged catalyst is sulfided prior to its loading into the reactor vessel, or pre-sulfided. The ex-situ sulfiding can include any number of suitable sulfiding methods including, for example, the contacting of the dried, aged catalyst with a sulfiding agent as mentioned above, or with a hydrogen sulfide-containing fluid under elevated temperature conditions followed by an optional passivation step.

The preferred sulfurization step provides for the incorporation of sulfur into the dried, aged catalyst by contacting the dried, aged catalyst with elemental sulfur under conditions that cause the sulfur to be incorporated into the pores of the dried, aged catalyst either by sublimation or by melting, or by a combination of both. Suitable sulfurization methods for this sulfur incorporation are described in detail in U.S. Pat. No. 5,468,372, which is incorporated herein by reference.

There are two general methods for carrying out the sulfurization of the dried, aged catalyst with elemental sulfur. The first and preferred method comprises contacting the dried, aged catalyst with elemental sulfur at a temperature such that the elemental sulfur is substantially incorporated in the pores of the dried, aged catalyst by sublimation and/or melting and subsequently heating the thus sulfur-incorporated dried, aged catalyst in the presence of a liquid olefinic hydrocarbon at a temperature greater than about 150° C.

The second method comprises contacting the dried, aged catalyst with a mixture of powdered elemental sulfur and a liquid olefinic hydrocarbon and heating the resultant mixture of olefin, sulfur and dried, aged catalyst to a temperature above about 150° C. In this procedure, the heating rate is sufficiently slow such that the sulfur is incorporated into the pores of the dried, aged catalyst by sublimation and/or melting prior to reaching the temperature at which the olefin reacts to make the sulfur more resistant to removal by stripping.

In the preferred sulfurization method, the dried, aged catalyst is first contacted with elemental sulfur at a temperature such that the sulfur is incorporated thereon by sublimation and/or melting. While the dried, aged catalyst can be contacted with sulfur in the molten state, it is preferred to first admix the dried, aged catalyst with powdered elemental sulfur and then heat the resultant mixture of sulfur and dried, aged catalyst to above the temperature at which sublimation of the sulfur occurs.

Generally, the dried, aged catalyst is heated in the presence of the powdered elemental sulfur at a temperature greater than about 80° C. Preferably, this sulfur impregnation step will be carried out at a temperature ranging from about 90° C. to about 130° C. or higher, for example, up to the boiling point of sulfur of about 445° C. It is preferred for the dried, aged catalyst and sulfur to be heated together at a temperature ranging from about 105° C. to about 125° C. Typically, the dried, aged catalyst and powdered sulfur is placed in a vibratory or rotary mixer and heated to the desired temperature for sufficient time to allow the sulfur to be incorporated into the pores of the dried, aged catalyst. The time period for heating typically will range from about 0.1 hour to about 10 hours or longer.

The amounts of sulfur used will depend upon the amounts of catalytic metal present in the dried, aged catalyst that needs to be converted to the sulfide. Typically the amount of sulfur used is determined on the basis of the stoichiometric amount of sulfur required to convert all of the metal in the dried, aged catalyst to the sulfide form. For example a dried, aged catalyst containing molybdenum would require two moles of sulfur to convert each mole of molybdenum to molybdenum disulfide, with similar determinations being made for other metals.

The sulfur-incorporated dried, aged catalyst is then contacted with a liquid olefin at such an elevated temperature and time period that the olefin reacts and provides the revitalized catalyst. Typically, the contact temperature is greater than about 150° C., and, more typically, it will range from about 150° C. to about 350° C., preferably from about 200° C. to about 325° C. Contact times will depend on the temperature and vapor pressure of the olefin, with higher temperatures and higher vapor pressures requiring shorter times. In general, contact times will range from about 0.1 hour to about 10 hours.

It is important for the olefin to be liquid at the elevated temperature of contact. It is preferred for the olefin to be a higher olefin, i.e., one having a carbon number greater than six, preferably greater than eight.

In one embodiment of the preferred sulfurizing method, the dried, aged catalyst is contacted simultaneously with both the elemental sulfur, preferably in powdered form, and the olefinic hydrocarbon. According to this method, a mixture of powdered elemental sulfur and olefinic hydrocarbon solvent is first produced. A ratio of oil to sulfur by weight ranging from about 1:1 to about 4:1 is suitable, with about 2:1 being a preferred ratio. The mixture may be heated to promote homogenous mixing of the components, particularly if the olefinic hydrocarbon is not liquid at ambient conditions. Toluene or other lightweight hydrocarbon solvents may be added to decrease the viscosity of the mixture. Also, increased heat will achieve the same effect. The mixture of olefin and sulfur is then added to a preweighted dried, aged catalyst and mixed therewith. The mixture of dried, aged catalyst, olefin and sulfur is then heated to the olefin reaction temperature of above about 150° C. Preferably, the temperature is in the range of from about 150° C. to about 350° C., and, more preferably, from about 200° C. to about 325° C. The heating time is in the range of from about 0.1 to about 10 hours.

The sulfurized dried aged catalyst may also be further treated with sulfur by sulfiding it either in-situ or ex-situ or a combination thereof.

The spent catalysts treated in accordance with the inventive methods described herein will have restored catalytic activity. Particularly, the treated spent catalysts will have catalytic activity greater than the catalytic activity of the spent catalyst prior to treatment thereof. The catalytic activity of the restored catalyst can be such that its RVA is greater than 0.8, but, more particularly, the RVA of the restored catalyst can be greater than 0.85. It is preferred to maximize the amount of restored activity to the spent hydroprocessing catalyst by the inventive method, and, thus, it is preferred for the RVA of the restored catalyst to exceed 0.9 and, most preferably, the RVA exceeds 0.95.

The hydroprocessing catalysts treated in accordance with the methods described herein and the inventive restored catalysts can be suitably used to hydrotreat hydrocarbon feedstock under hydrotreating conditions as fully described herein above.

The following Examples are presented to illustrate the invention, but they should not be construed as limiting the scope of the invention.

EXAMPLE 1

This Example 1 describes the three laboratory methods used to revitalize and restore catalytic activity to a commercially available hydroprocessing catalyst that had become spent through its use in the hydrotreatment of distillate feedstock.

Sample A was obtained by the burning of carbon from the spent hydroprocessing catalyst (the carbon burn may also be referred to as regeneration) followed by sulfurization. There was no intermediate chelation treatment or calcination prior to sulfurization of the regenerated spent hydroprocessing catalyst. Sample B was obtained by burning carbon from the spent hydroprocessing catalyst followed by a chelating treatment, drying and calcining prior to a sulfurization treatment. Sample C was obtained by burning carbon from the spent hydroprocessing catalyst followed by a chelating treatment and drying prior to a sulfurization treatment. There was no intermediate calcination of the chelant treated catalyst prior to the sulfurization.

A Sample of the spent hydroprocessing catalyst was obtained from a commercial user of the catalyst. The hydroprocessing catalyst contained the hydrogenation metal components of nickel (approximately 2.6 wt. %) and molybdenum (approximately 14.5 wt. %) and a phosphorous promoter (approximately 3 wt. %) that are supported on an alumina support. The fresh hydroprocessing catalyst is marketed by Criterion Catalysts & Technologies of Houston, Tex.

The spent hydroprocessing catalyst described above was subjected to a carbon burn by passing air over the sample of spent hydroprocessing catalyst at a maximum temperature of 450° C. The carbon concentration of the spent catalyst before the carbon burn exceeded 10 weight percent of the total weight of the spent catalyst and, after the carbon burn, the carbon concentration was about 0.13 weight percent. This regenerated catalyst was then used to make Samples A, B and C as described below.

Sample A

An aliquot of the regenerated catalyst described above was subjected to a sulfurization treatment without an intermediate chelation treatment or calcination.

To sulfurize the regenerated catalyst, 13.5 parts by weight of elemental sulfur was added to and mixed with 100 parts by weight of regenerated catalyst. The mixture was then brought to a temperature of about 120° C. and maintained for a period of time sufficient to incorporate the sulfur into the pores of the dried catalyst.

Following the sulfur incorporation, an alpha olefin blend containing alpha olefins having from 14 to 30 carbon atoms was incorporated into the pores of the sulfur incorporated, regenerated catalyst by incipient wetness. The amount of the alpha olefin added to the sulfur incorporated, regenerated catalyst was sufficient to fill approximately 90 volume percent of the available pore volume. The thus-prepared catalyst was then subjected to a heat treatment by heating the samples in flowing air at a temperature of about 260° C. for a period sufficient to provide the Sample A used in the activity testing of Example 2.

Sample B

To prepare Sample B, an aliquot of the regenerated catalyst described above was subjected to a chelating treatment. The chelating solution used to treat the regenerated catalyst sample comprised of one (1) part by weight DTPA, 0.11 part by weight ammonium hydroxide, and 10 parts by weight water. The regenerated sample was impregnated with the chelating solution by a standard incipient wetness procedure by which approximately 98 volume percent of the available pore volume of the regenerated catalyst was filled with the chelating solution. The impregnated, regenerated catalyst was then allowed to age for an aging time period of two weeks at room temperature in a sealed container to provide an aged catalyst.

The aged catalyst sample was then dried in air at a temperature of about 150° C. for a period of about 2 hours. Following the drying step, the dried aged catalyst was then subjected to calcination conditions whereby air at a temperature of about 425° C. was passed over the dried aged catalyst for a period of two hours.

The resulting dried and calcined aged catalyst was then subjected to a sulfurization treatment whereby 13.5 parts by weight of elemental sulfur was added to and mixed with 100 parts by weight of the dried and calcined aged catalyst. The mixture was then brought to a temperature of about 120° C. and maintained for a period of time sufficient to incorporate the sulfur into the pores of the dried and calcined aged catalyst.

Following the sulfur incorporation, an alpha olefin blend containing alpha olefins having from 14 to 30 carbon atoms was incorporated into the pores of the sulfur incorporated, dried and calcined aged catalyst by incipient wetness. The amount of the alpha olefin added to the sulfur incorporated, dried aged catalyst was sufficient to fill approximately 90 volume percent of the available pore volume. The thus-prepared catalyst was then subjected to a heat treatment by heating the samples in flowing air at a temperature of about 260° C. for a period sufficient to provide the Sample B used in the activity testing of Example 2.

Sample C

To prepare Sample C, an aliquot of the regenerated catalyst described above was subjected to a chelating treatment. The chelating solution used to treat the regenerated catalyst sample comprised of one (1) part by weight DTPA, 0.11 part by weight ammonium hydroxide, and 10 parts by weight water. The regenerated sample was impregnated with the chelating solution by a standard incipient wetness procedure by which approximately 98 volume percent of the available pore volume of the regenerated catalyst was filled with the chelating solution. The impregnated, regenerated catalyst was then allowed to age for an aging time period of two weeks at room temperature in a sealed container to provide an aged catalyst.

The aged catalyst sample was then dried in air at a temperature of about 150° C. for a period of about 2 hours. This drying was conducted such that a major portion of the DTPA chelating agent remained on the resulting dried catalyst and that a major portion of the water was removed from the aged catalyst.

This dried aged catalyst was then subjected to a sulfurization treatment, without undergoing a prior calcination treatment, whereby 13.5 parts by weight of elemental sulfur was added to and mixed with 100 parts by weight of the dried aged catalyst. The mixture was then brought to a temperature of about 120° C. and maintained for a period of time sufficient to incorporate the sulfur into the pores of the dried aged catalyst.

Following the sulfur incorporation, an alpha olefin blend containing alpha olefins having from 14 to 30 carbon atoms was incorporated into the pores of the sulfur incorporated, dried aged catalyst by incipient wetness. The amount of the alpha olefin added to the sulfur incorporated, dried aged catalyst was sufficient to fill approximately 90 volume percent of the available pore volume. The thus prepared catalyst was then subjected to a heat treatment by heating the samples in flowing air at a temperature of about 260° C. for a period sufficient to provide the Sample C used in the activity testing of Example 2.

EXAMPLE 2

This Example 2 describes the laboratory testing procedure and the feedstocks used to test the catalytic activity of the catalyst samples described in Example 1 relative to the catalytic activity of the fresh hydroprocessing catalyst.

The properties of the feeds used in the performance of the activity tests are presented in Table 1. To perform the activity tests, 50 cc of the relevant catalyst sample was placed in a test reactor operated under hydrotreating reaction conditions. The reaction conditions included a reaction temperature of about 360° C., total pressure of about 1650 psia, a feed rate such that the liquid hourly space velocity was about 1.5 hr$^{-1}$, hydrogen-to-oil ratio of about 3700 SCF/bbl, and an operating time of about 400 hr.

TABLE 1

| Feed Properties Used in Activity Tests | |
|---|---|
| FEED PROPERTIES | FEED |
| Sulfur, wt % | 0.491 |
| Nitrogen, ppm | 1800 |
| Aromatics, wt % | 31.2 |
| Density @15.6° C., g/cc | 0.946 |
| TBP (by GC) | |
| IBP (° F.) | 317 |
| 10% | 471 |
| 50% | 587 |
| 90% | 691 |
| FBP | 790 |

The results of the activity testing described in this Example 2 are presented in Table 2.

TABLE 2

Relative Volumetric Activity of Spent Catalyst Samples Treated by Various Methods

|  |  | RVA (HDN) |
|---|---|---|
| FRESH CATALYST |  | 1.00 |
| SAMPLE A | Regen Only | 0.82 |
| SAMPLE B | Regen/Chelation/Calcination | 1.00 |
| SAMPLE C | Regen/Chelation/No Calcination | 1.09 |

The results presented in Table 2 show that, in the method for the restoration of catalytic activity to a spent hydroprocessing catalyst, further enhancements in the restored catalytic activity can be achieved by the use of a chelating treatment of the spent hydroprocessing catalyst that has been regenerated by the removal of carbon therefrom by burning, i.e. regeneration. Further shown by the data is that the spent hydroprocessing catalyst that has been regenerated and treated with a chelating agent but not subjected to calcination conditions prior to its sulfurization has a higher restored catalytic activity than such a regenerated and chelation treated catalyst that has otherwise been calcined prior to sulfurization. In fact, the data show that the revitalized hydroprocessing catalyst made by the regeneration of the spent hydroprocessing catalyst that is treated with a chelating agent followed by sulfurization with no intermediate calcination has an RVA exceeding that of fresh catalyst.

Reasonable variations, modifications and adaptations of the invention can be made within the scope of the described disclosure and the appended claims without departing from the scope of the invention.

That which is claimed is:

1. A method of restoring the activity of a spent non-additive based hydroprocessing catalyst comprising a catalytically active metal component and a support, said method comprising:

Contacting with a solution said spent non-additive based hydroprocessing catalyst having a reduced catalytic activity relative to a non-additive based hydroprocessing catalyst in its fresh state prior to use thereof to thereby become said spent non-additive based hydroprocessing catalyst, wherein said solution comprises a solvent and a chelating agent capable of forming a complex with said catalytically active metal component of said spent non-additive based hydroprocessing catalyst, and wherein said contacting is done for a time period from about 10 hours to about 900 hours during which time period said chelating agent reacts with and re-disperses said catalytically active metal component thereby resulting in an aged catalyst having incorporated therein said chelating agent and said solvent and a re-dispersed catalytically active metal component;

Exposing said aged catalyst to conditions including a drying temperature less than 250° C. so as to remove from said aged catalyst a portion of said solvent without removing more than 50 weight percent of said chelating agent from said aged catalyst thereby resulting in a dried aged catalyst; and Sulfur treating said dried aged catalyst without prior exposure to a calcination temperature exceeding 400° C., to yield a restored hydroprocessing catalyst.

2. A method as recited in claim 1, wherein said solution and said spent non-additive based hydroprocessing catalyst are contacted for a time period of from 20 hours to 600 hours at a temperature between 5° C. and 90° C.

3. A method as recited in claim 2, wherein said chelating agent of said solution is a chelant that contains at least one nitrogen atom that is capable of serving as the electron donor atom for forming a complex with a metal of said spent hydroprocessing catalyst.

4. A method as recited in claim 3, wherein said chelating agent is selected from the group of compounds consisting of aminocarboxylic acids, polyamines, aminoalcohols, oximes, and polyethyleneimines.

5. A method as recited in claim 4, wherein the contacting of said spent non-additive based hydroprocessing catalyst with said solution is such as to incorporate into said spent non-additive based hydroprocessing catalyst an amount of said chelating agent in the range of from 0.005 moles chelating agent per mole of active metal to 1 mole of chelating agent per mole of active metal.

6. A method as recited in claim 5, wherein said time period for the contacting of said spent non-additive based hydroprocessing catalyst with said solution exceeds about 40 hours thereby providing said aged catalyst.

7. A method as recited in claim 6, the contacting of said spent non-additive based hydroprocessing catalyst with said solution is conducted at an aging temperature in the range of about the freezing temperature of said solution to about the boiling temperature of said solution.

8. A method as recited in claim 7, wherein the conditions to which said aged catalyst is exposed prior to the sulfur treating of said dried aged catalyst includes a maximum exposure temperature that is less than a calcination temperature of 300° C.

9. A method as recited in claim 8, wherein said maximum exposure temperature is said drying temperature that is less than 175° C.

10. A method as recited in claim 9, wherein said dried aged catalyst has a concentration of said chelating agent and the amount of said chelating agent removed from said aged catalyst is less than 25 weight percent of the chelating agent incorporated into said spent catalyst.

11. A method as recited in claim 10, wherein the amount of said chelating agent removed from said aged catalyst is less than 10 weight percent of the chelating agent incorporated into said spent non-additive based hydroprocessing catalyst.

12. A method of restoring catalytic activity to a spent non-additive based hydrotreating catalyst, said method comprises:

providing said spent hydrotreating catalyst having a first carbon concentration;

reducing the concentration of carbon on said spent hydrotreating catalyst to provide a carbon-reduced catalyst having a second carbon concentration that is less than said first carbon concentration;

exposing said carbon-reduced catalyst to a solution comprising a chelating agent and a solvent for an aging time period from about 10 hours to about 900 hours during which time period said chelating agent reacts with and re-disperses catalytically active metals present in said spent non-additive based hydrotreating catalyst, thereby resulting in an aged catalyst having incorporated therein said chelating agent and said solvent and re-dispersed catalytically active metals;

exposing said aged catalyst to conditions including a drying temperature of from 90° C. to 200° C. so as to remove from said aged catalyst a portion of said solvent without removing a significant portion of said chelating agent from said aged catalyst thereby resulting in a dried aged catalyst; and Sulfur treating said dried aged catalyst without prior exposure to a calcination temperature exceeding 400° C., to yield a restored catalyst.

13. A method as recited in claim 12, wherein said first carbon concentration exceed 3 weight percent, with the weight percent being based on the total weight of said spent hydrotreating catalyst.

14. A method as recited in claim 13, wherein said second carbon concentration is less than 3 weight percent, with the weight percent being based on the total weight of said carbon-reduced catalyst.

15. A method as recited in claim 14, wherein said chelating agent of said solution is a chelant that contains at least one nitrogen atom that is capable of serving as the electron donor atom for forming a complex with a metal of said spent hydroprocessing catalyst.

16. A method as recited in claim 15, wherein said chelating agent is selected from the group of compounds consisting of aminocarboxylic acids, polyamines, aminoalcohols, oximes, and polyethyleneimines.

17. A method as recited in claim 16, wherein the exposing of said carbon-reduced catalyst with said solution is such as to incorporate into said carbon-reduced catalyst an amount of said chelating agent in the range of from 0.005 moles chelating agent per mole of active metal to 1 mole of chelating agent per mole of active metal.

18. A method as recited in claim 17, wherein said aging time period for exposing said carbon-reduced catalyst with said solution exceeds about 20 hours thereby providing said agent catalyst.

19. A method as recited in claim 18, the exposing of said carbon-reduced catalyst with said solution is conducted at an aging temperature in the range of from about 0° C. to about 100° C.

20. A method as recited in claim 19, wherein the condition to which said aged catalyst is exposed prior to sulfur treating said dried aged catalyst includes a maximum exposure temperature that is less than a calcination temperature of 300° C.

21. A method as recited in claim 20, wherein said maximum exposure temperature is said drying temperature that is less than 175° C.

22. A method as recited in claim 21, wherein said dried aged catalyst has a concentration of said chelating agent and said significant portion of said chelating agent removed from said aged catalyst is less than 50 weight percent of the chelating agent incorporated into said carbon-reduced catalyst.

23. A method as recited in claim 22, wherein said significant portion of said chelating agent removed from said aged catalyst is less than 25 weight percent of the chelating agent incorporated into said carbon-reduced catalyst.

24. A method, comprising:
providing a spent non-additive based hydrotreating catalyst further containing carbon;
removing a portion of said carbon from said spent hydrotreating catalyst to thereby provide a carbon-reduced catalyst;
incorporating a chelating agent into said carbon-reduced catalyst by exposing said carbon-reduced catalyst to a solution comprising said chelating agent and a solvent;
aging the resulting chelant-incorporated carbon-reduced catalyst for an aging time period from about 20 hours to about 600 hours during which time period said chelating agent reacts with and re-disperses catalytically active metals present in said spent non-additive based hydrotreating catalyst, to thereby provide an aged catalyst;
drying said aged catalyst at a drying temperature so as to remove from said aged catalyst a portion of said solvent without removing a significant portion of said chelating agent from said aged catalyst thereby resulting in a dried aged catalyst; and
Sulfur treating said dried aged catalyst without prior exposure to a calcination temperature exceeding 400° C., to yield a restored catalyst.

25. A method as recited in claim 24, wherein said chelating agent of said solution is a chelant that contains at least one nitrogen atom that is capable of serving as the electron donor atom for forming a complex with a metal of said spent hydroprocessing catalyst.

26. A method as recited in claim 25, wherein said chelating agent is selected from the group of compounds consisting of aminocarboxylic acids, polyamines, aminoalcohols, oximes, and polyethyleneimines.

27. A method as recited in claim 26, wherein the amount of said chelating agent incorporated into said carbon-reduced catalyst is in the range of from 0.005 moles chelating agent per mole of active metal to 1 mole of chelating agent per mole of active metal.

28. A method as recited in claim 27, wherein said aging time period for exposing said carbon-reduced catalyst with said solution exceeds about 40 hours thereby providing said aged catalyst.

29. A method as recited in claim 28, the exposing of said carbon-reduced catalyst with said solution is conducted at an aging temperature in the range of from about 0° C. to about 100° C.

30. A method as recited in claim 29, wherein said drying temperatures to which said aged catalyst is exposed prior to sulfur treating said dried aged catalyst includes a maximum exposure temperature that is less than a calcination temperature of 300° C.

31. A method as recited in claim 30, wherein said maximum exposure temperature is said drying temperature that is less than 250° C.

32. A method as recited in claim 31, wherein said dried aged catalyst has a concentration of said chelating agent and said significant portion of said chelating agent removed from said aged catalyst is less than 50 weight percent of the chelating agent incorporated into said carbon-reduced catalyst.

33. A method as recited in claim 32, wherein said significant portion of said chelating agent removed from said aged catalyst is less than 25 weight percent of the chelating agent incorporated into said carbon-reduced catalyst.

34. A method as recited in claim 33, wherein said aging time period for exposing said carbon-reduced catalyst with said solution is from 40 to 400 hours at a temperature of from 10° C. to 60° C.; said drying temperature for drying said aged catalyst is 100° C. to 175° C.; the amount of chelating agent removed from said aged catalyst is less than 10 weight percent of the chelating agent incorporated into said carbon-reduced catalyst; and the said restored hydroprocessing catalyst has a relative volumetric activity (RVA) exceeding the relative volumetric activity of said spent non-additive based hydroprocessing catalyst in its fresh state prior to use.

* * * * *